US010467560B2

(12) United States Patent
Kohler et al.

(10) Patent No.: US 10,467,560 B2
(45) Date of Patent: Nov. 5, 2019

(54) SYSTEM AND METHOD FOR ADAPTIVE MULTIPLE CONTACT ASSIGNMENT

(75) Inventors: Joylee E Kohler, Northglenn, CO (US); Pawan Aggarwal, Haryana (IN); Kedar Swadi, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 853 days.

(21) Appl. No.: 12/894,624

(22) Filed: Sep. 30, 2010

(65) Prior Publication Data
US 2012/0084111 A1 Apr. 5, 2012

(51) Int. Cl.
*G06Q 10/00* (2012.01)
*G06Q 10/06* (2012.01)
*G06Q 30/00* (2012.01)

(52) U.S. Cl.
CPC ........... *G06Q 10/06311* (2013.01); *G06Q 10/063112* (2013.01); *G06Q 30/01* (2013.01)

(58) Field of Classification Search
CPC ..... G06Q 10/06311; G06Q 10/063112; G06Q 30/01
See application file for complete search history.

(56) References Cited

U.S. PATENT DOCUMENTS

| | | | |
|---|---|---|---|
| 5,206,903 A | 4/1993 | Kohler et al. | |
| 5,828,747 A | 10/1998 | Fisher et al. | |
| 5,905,793 A | 5/1999 | Flockhart et al. | |
| 5,982,873 A | 11/1999 | Flockhart et al. | |
| 6,163,607 A | 12/2000 | Bogart et al. | |
| 6,173,053 B1 * | 1/2001 | Bogart et al. | 379/266.01 |
| 6,192,122 B1 | 2/2001 | Flockhart et al. | |
| 7,461,016 B2 * | 12/2008 | Todd | 705/26.43 |
| 7,617,136 B1 * | 11/2009 | Lessing et al. | 705/28 |
| 2006/0031142 A1 * | 2/2006 | Todd | 705/26 |
| 2007/0203785 A1 * | 8/2007 | Thompson et al. | 705/10 |
| 2007/0230682 A1 * | 10/2007 | Meghan et al. | 379/265.06 |
| 2007/0282807 A1 * | 12/2007 | Ringelman et al. | 707/3 |

(Continued)

OTHER PUBLICATIONS

Adaptive behavior of impatient customers in tele-queues: Theory and empirical support[PDF] from jstor.org E Zohar, A Mandelbaum . . . —Management Science, 2002—JSTOR.*
Analysis of the Avis Car Rental South Africa Call Centre, Inge Wagenaar, Bachelor's thesis, University of Pretoria, Pretoria, Oct. 2008, pp. 1-77.*

(Continued)

*Primary Examiner* — Jonathan G Sterrett
(74) *Attorney, Agent, or Firm* — Stevens & Showalter, L.L.P.

(57) ABSTRACT

Embodiments of the present invention generally relate to a system and method for adaptively assigning multiple contacts to an agent determined by that agent's current metrics data or effectiveness measure. In one embodiment, there is provided a method for adaptively assigning multiple contacts to an agent in a contact center, comprising providing a reporting engine containing an agent's metrics; providing an assignment engine for assigning multiple contacts to the agent based upon the agent's metrics received from the reporting engine; storing each contact being served by the agent with at least one agent metrics element to be measured by the reporting engine; updating the agent's metrics in the reporting engine based upon the measured at least one metrics element; comparing the agent's updated metrics with stored target metrics; and assigning multiple contacts to the agent when the agent's metrics is within the target metrics.

24 Claims, 6 Drawing Sheets

(56) References Cited

U.S. PATENT DOCUMENTS

| 2008/0043987 | A1* | 2/2008 | Waalkes et al. | 379/265.11 |
| 2008/0267388 | A1* | 10/2008 | Odinak et al. | 379/265.09 |
| 2009/0232295 | A1* | 9/2009 | Ryskamp | 379/265.11 |
| 2010/0086120 | A1* | 4/2010 | Brussat et al. | 379/265.12 |
| 2011/0010184 | A1* | 1/2011 | Keren et al. | 705/1.1 |
| 2011/0191681 | A1* | 8/2011 | Stark | 715/716 |
| 2012/0069975 | A1* | 3/2012 | Odinak et al. | 379/88.14 |
| 2012/0140906 | A1* | 6/2012 | Odinak et al. | 379/88.11 |

OTHER PUBLICATIONS

A staffing algorithm for call centers with skill-based routing[PDF] from columbia.edu RB Wallace . . . —Manufacturing and Service Operations . . . , 2005—ieor.columbia.edu.*

Call center benchmarking: how good is"good enough"[PDF] from purdue.edu J Anton . . . —2000—books.google.com.*

Dynamic routing policies for multiskill call centers[PDF] from vu.nlS Bhulai—Probability in the Engineering and Informational . . . , 2009—dl.acm.org.*

What You Should Know About Queueing Models to Set Staffing Requirements in Service Systems, Ward Whitt, Department of Industrial Engineering and Operations Research, Columbia University, Apr. 26, 2007, pp. 1-18.*

"The History of the Call Center Explains How Customer Service Got So Annoying" from http://motherboard.vice.com/read/the-history-of-the-call-center-explains-how-customer-service-got-so-annoying, Smith, Ernie, Aug. 5, 2016.*

Publication; "Definity Generic 3 Call Vectoring/Expert Agent Selection (EAS) Guide" ; Sep. 1995; Issue 4; AT&T Publication No. 555-230-520.

* cited by examiner

SYSTEM AND METHOD FOR ADAPTIVE MULTIPLE CONTACT ASSIGNMENT

BACKGROUND OF THE INVENTION

Field of the Invention

Embodiments of the present invention generally relate to contact center agent assignment management and in particular to a system and method for adaptively assigning multiple contacts to an agent determined by that agent's current metrics data or effectiveness measure.

Description of Related Art

As multichannel/multi-medium contact centers become more prevalent, agents are increasingly being expected to handle multiple contacts simultaneously. For example, it is not uncommon for one agent to handle multiple chats or an e-mail and voice call all at substantially the same time.

There is no known way to measure or track how effective an agent is at this type of multitasking at any given time or using an effectiveness measure to adapt what unrelated contacts are distributed to what agent(s). Therefore, because agents are human, and, as such, may not have the same effectiveness from day to day, or hour to hour, an agent's ability to multi-task may waiver from time to time. This may result in customer dissatisfaction and issues with contact center management such as sudden and unpredictable understaffed conditions due to the shift from an agent being able to handle multiple contacts at one moment to only one at a time at another moment. This unpredictability of agent availability for multiple contact assignments can be devastating to contact center management and business continuity.

Current multiple call or contact handling options put the agent(s) in control of when they accept multiple contacts or whether they have a configured limit. For example, on a current Avaya Interaction Center, an agent can configure by medium how many contacts can be simultaneously delivered to that agent.

In current systems, there is no way to know how effective the agent is in handling multiple unrelated contacts at any given time and therefore the solution referred to above cannot adapt the delivery of multiple contacts to agents depending on their effectiveness. If the agents are controlling when they receive multiple contacts, they may be unaware of how effective or ineffective they are at any given time. For example, if the agent is not feeling well, did not get enough sleep, or has had a major life event, the agent may not realize it would be better to stay focused on a single contact at that moment.

Similarly, some agents may be able to handle multiple unrelated contacts as long as they all use the same medium, or as long as they all use a different medium. Some agents may be able to handle multiple unrelated contacts as long as they are all from the same queue, or as long as they are all from different queues. For example, on one day, an agent may be able to effectively handle four web chats simultaneously but only one voice contact. But on another day, the same agent may be able to only handle effectively two contacts on any medium but if the agent is given a third, the effectiveness of the agent's service drops significantly.

Thus, there is a need, in a contact center environment or elsewhere, for the ability to adapt, in real time or near real time, agent multiple assignments based upon how effective the agent is handling multiple unrelated contacts at any given time.

SUMMARY

Embodiments of the present invention generally relate to a system and method for adaptively measuring contact center agents' metrics, including but not limited to effectiveness, efficiency, performance, progress, or quality of process, in scripting and processing multiple, unrelated contacts both on the same medium or on different media and also on the same or different queues.

In one embodiment of the present invention, there is provided a method for adaptively assigning multiple contacts to an agent in a contact center, comprising providing a reporting engine containing an agent's metrics; providing an assignment engine for assigning multiple contacts to the agent based upon the agent's metrics received from the reporting engine; storing each contact being served by the agent with at least one agent metrics element to be measured by the reporting engine; updating the agent's metrics in the reporting engine based upon the measured at least one metrics element; comparing the agent's updated metrics with stored target metrics; and assigning multiple contacts to the agent when the agent's metrics is within the target metrics.

In this embodiment, the at least one metrics element of the storing step may comprise the number of contacts simultaneously being scripted and processed by the agent or the number of media types simultaneously being scripted and processed by the agent or the number of different queues simultaneously being scripted and processed by the agent.

The comparing step of this embodiment may further comprise obtaining a ratio for each measured at least one metrics element by comparing the average metrics value when an agent scripts and processes one contact with when the agent scripts and processes more than one contact substantially simultaneously.

In this embodiment, the metrics parameters for measuring each at least one agent metrics element may be selected from a group consisting of average quality score, average customer satisfaction score, average revenue, average handle duration, percentage of first contact resolution, and any combination thereof.

In accordance with another embodiment, there is provided a system for adaptively assigning multiple contacts to an agent in a contact center, comprising a contact center computer server, comprising a reporting engine having a database for storing historical and updated agent's metrics data and target metrics data; an assignment engine for adaptively assigning multiple contacts to the agent based upon the agent's metrics data received from the reporting engine, whereby when the agent's metrics is within the target metrics, the assignment engine assigns multiple contacts to the agent and when the agent's metrics is not within the target metrics, the assignment engine assigns one contact to the agent.

In accordance with another embodiment, there is provided a system, comprising a computer server, the computer server comprising a tangible computer readable medium comprising program instructions, wherein the program instructions are computer-executable to implement storing and reporting agent historical and updated metrics data; storing target metrics data; assigning contacts to agents based upon agent historical and updated metrics data; storing each contact being served by the agent with at least one agent metrics element; updating the agent's metrics based upon the measured at least one metrics element; comparing the agent's updated metrics with stored target metrics; and assigning multiple contacts to the agent when the agent's metrics is within the target metrics.

The at least one metrics element of this embodiment may comprise the number of contacts simultaneously being scripted and processed by the agent or the number of media types simultaneously being scripted and processed by the agent or the number of different queues simultaneously being scripted and processed by the agent.

BRIEF DESCRIPTION OF THE DRAWINGS

So the manner in which above recited features of the present invention can be understood in detail, a more particular description of embodiments of the present invention, briefly summarized above, may be had by reference to embodiments, several of which are illustrated in the appended drawings. It is to be noted, however, the appended drawings illustrate only typical embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

DETAILED DESCRIPTION

Embodiments of the present invention generally relate to a system and method for adaptively measuring contact center agents' metrics, including but not limited to effectiveness, efficiency, performance, progress, or quality of process, in scripting and processing multiple, unrelated contacts both on the same medium or on different media and also on the same or different queues.

As used herein in connection with embodiments of the present invention, the term "metrics" is defined as standards of measurement by which at least efficiency, performance, progress, or quality of process of an agent can be assessed. Although described in the context of a contact center, it is to be understood that this system and method is contemplated and within the scope of embodiments of this invention to be applied to any system where agents are called upon to assist multiple customers at any given time, either simultaneously or substantially simultaneously.

Figure 1:
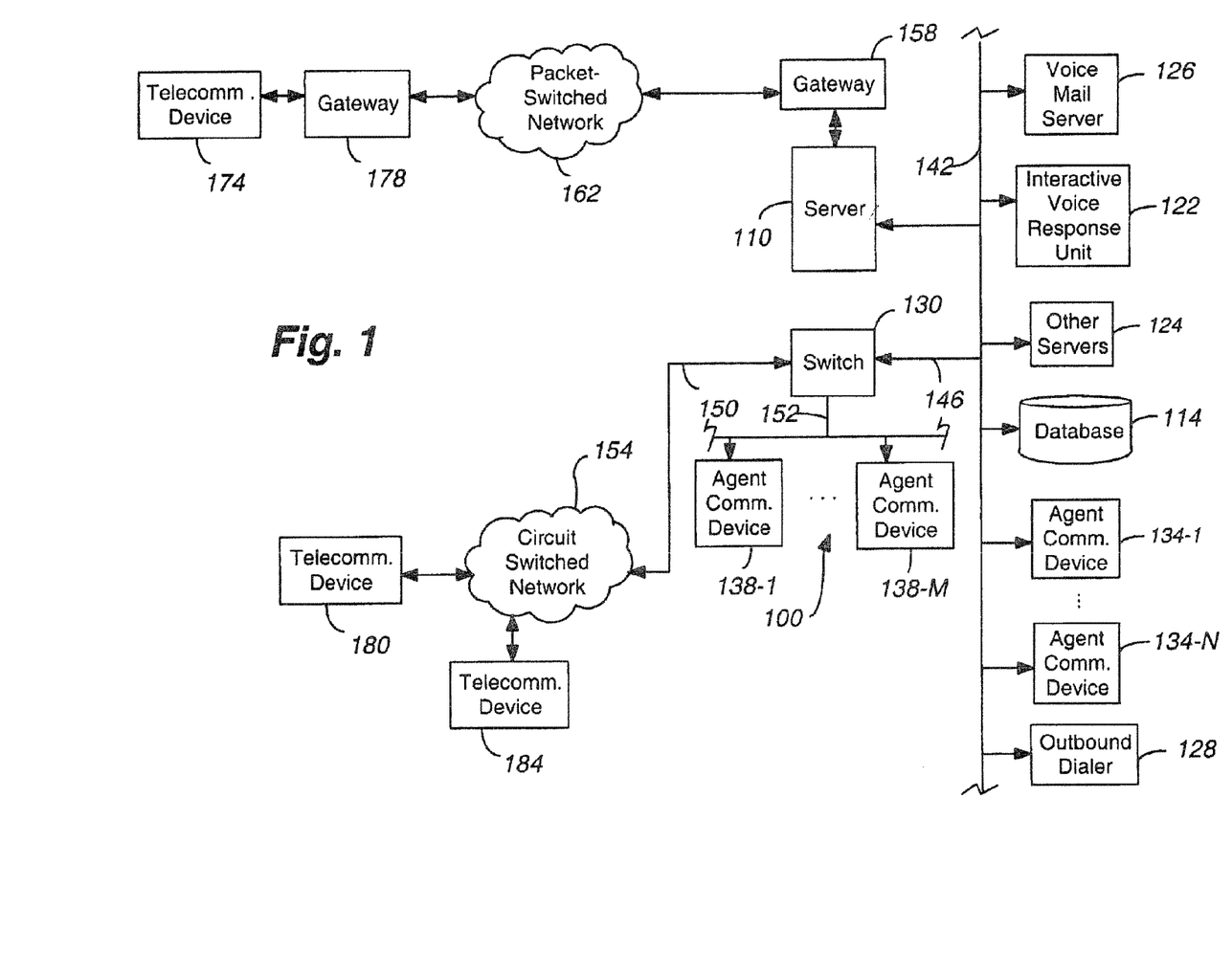
FIG. 1 is a block diagram depicting a contact center in accordance with an embodiment of the present invention.

FIG. 1 depicts an illustrative embodiment of a contact center of the present invention where contact center agents may service their assigned contacts, either singularly or in multiples, simultaneously or substantially simultaneously. A contact center 100 comprises a central server 110 (described in more detail in connection with FIG. 2), a set of data stores or databases 114, which may or may not be contained within the central server 110, the databases 114 containing agent metrics, contact or customer related information, and other information that can enhance the value and efficiency of the contact, and a plurality of servers, namely a voice mail server 126, an Interactive Voice Response (IVR) unit/system 122, and other servers 124, an outbound dialer 128, a switch 130, a plurality of working agents operating packet-switched (first) telecommunication devices 134-1 to N (such as computer work stations or personal computers or handheld communication devices including wireless communication devices), and/or circuit-switched (second) telecommunication devices 138-1 to M, all interconnected by a local area network LAN (or wide area network WAN) 142. The servers can be connected via optional communication lines 146 to the switch 130. As will be appreciated, the other servers 124 can also include a scanner (which is normally not connected to the switch 130 or Web server), VoIP software, video call software, voice messaging software, an IP voice server, a fax server, a web server, and an email server) and the like. The switch 130 is connected via a plurality of trunks 150 to the Public Switch Telecommunication Network (PSTN) 154 and via link(s) 152 to the second telecommunication devices 138-1 to M. A gateway 158 is positioned between the server 110 and the packet-switched network 162 to process communications passing between the server 110 and the network 162.

The term "switch" or "server" as used herein should be understood to include a PBX, an ACD, an enterprise switch, or other type of telecommunications system switch or server, as well as other types of processor-based communication control devices such as media servers, computers, adjuncts, etc.

The server and/or switch can be a software-controlled system including a processing unit (CPU), microprocessor, or other type of digital data processor executing software or an Application-Specific Integrated Circuit (ASIC) as well as various portions or combinations of such elements.

Figure 2:
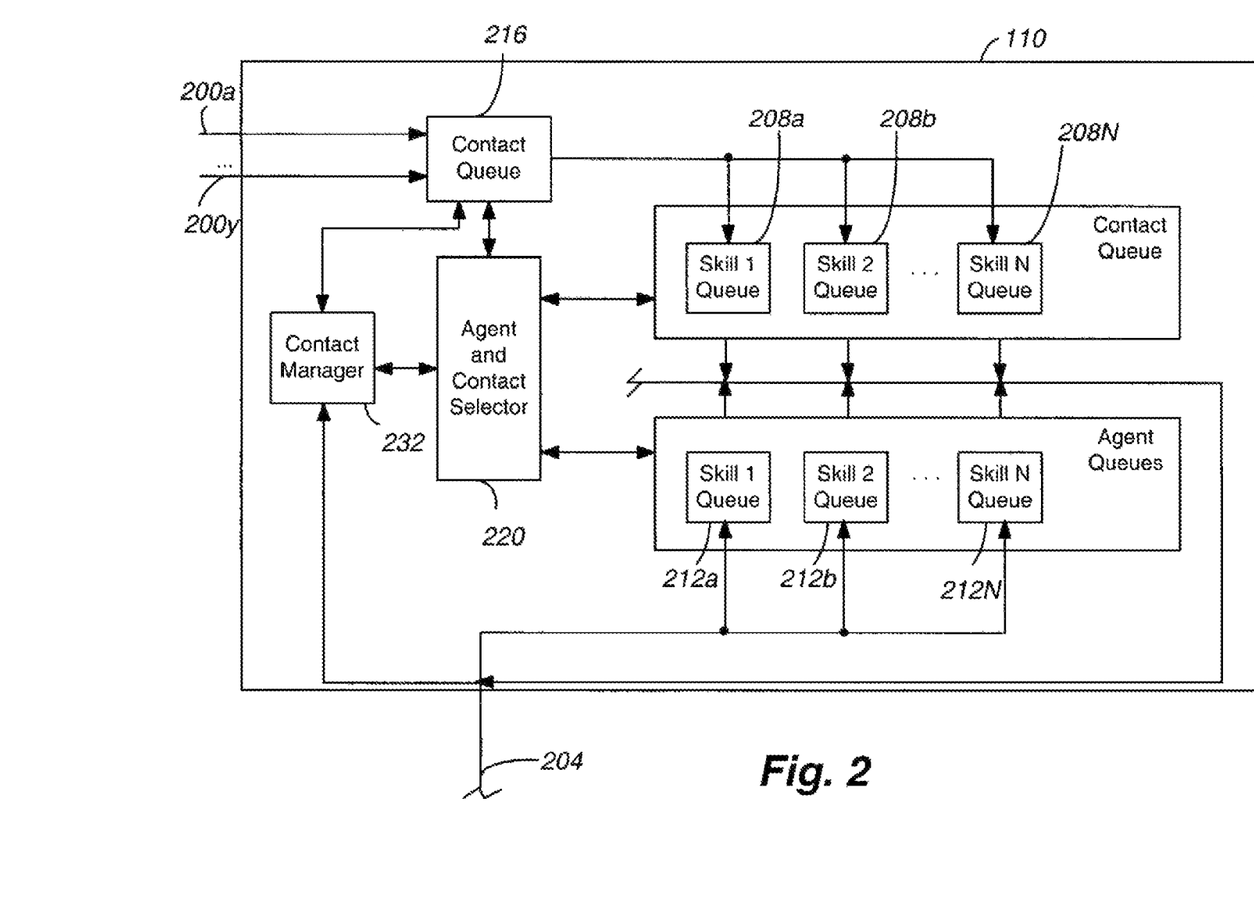
FIG. 2 is a block diagram depicting a server of the contact center of FIG. 1 in accordance with an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as LAN 142 and/or a circuit switched voice line). The server 110 can include a Basic Call Management System (BCMS) (not shown) and a Call Management System (CMS) (not shown) that gathers call records and contact-center statistics for use in generating contact-center reports.

The switch 130 and/or server 110 can be any computer and/or telecommunication architecture for directing contacts to one or more telecommunication devices to be serviced by one or more agents. Illustratively, the switch and/or server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; MultiVantage™ PBX, CRM Central 2000 Server™; Communication Manager™, and/or S8300™ media server.

Typically, the switch/server is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. The switch and/or server typically include a network interface card (NIC) (not shown) to provide services to the serviced telecommunication devices. Other types of known switches and servers are well known in the art and therefore not described in detail herein.

Referring again to FIG. 2, included among the data stored in the server 110 is a set of contact queues 208a-n and a separate set of agent queues 212a-n. Each contact queue 208a-n corresponds to a different set of agent skills, as does each agent queue 212a-n. Conventionally, contacts are prioritized and are either enqueued in individual ones of the contact queues 208a-n in their respective orders of priority or are enqueued in different ones of a plurality of contact queues that correspond to a different priority.

Likewise, each agent's skills are prioritized according to his or her level of expertise in that skill, and either agents are enqueued in individual ones of agent queues 212a-n in their order of expertise level or are enqueued in different ones of a plurality of agent queues 212a-n that correspond to a skill. Each one of which corresponds to a different expertise level.

A contact vector (queue) 216 is included among the control programs in the server 110. Contacts incoming to the contact center are assigned by contact vector 216 to different contact queues 208a-n based upon a number of predetermined criteria, including customer identity, customer needs, contact center needs, current contact center queue lengths, customer value, and the agent skill required for the proper handling of the contact.

Agents who are available for handling contacts are assigned to agent queues 212a-n based upon the skills they possess. An agent may have multiple skills, and hence may be assigned to multiple agent queues 212a-n simultaneously. Furthermore, an agent may have different levels of skill expertise (e.g., skill levels 1-N in one configuration or merely primary skills and secondary skills in another configuration), and hence may be assigned to different agent queues 212a-n at different expertise levels. Call vectoring is described in DEFINITY Communications System Generic 3. Call Vectoring/Expert Agent Selection (EAS) Guide, AT&T publication no. 555-230-520 (Issue 3, November 1993). Skills-based ACD is described in further detail in U.S. Pat. Nos. 6,173,053 and 5,206,903.

Referring again to FIG. 1, the gateway 158 can be Avaya Inc.'s, G700 Media Gateway™, and may be implemented as hardware such as via an adjunct processor (as shown) or as a chip in the server.

The first telecommunication devices 134-1, . . . 134-N are packet-switched and can include, for example, IP hardphones such as the Avaya Inc.'s 4600 Series IP Phones™, IP softphones such as Avaya Inc.'s IP Softphone™, Personal Digital Assistants or PDAs, Personal Computers or PCs, laptops, packet-based H.320 video phones and conferencing units, packet-based voice messaging and response units, and packet-based traditional computer telephony adjuncts.

The second telecommunication devices 138-1, . . . 138-M are circuit-switched. Each of the telecommunication devices 138-1, . . . 138-M corresponds to one of a set of internal extensions Ext1, . . . ExtM, respectively. These extensions are referred to herein as "internal" in that they are extensions within the premises directly serviced by the switch. More particularly, these extensions correspond to conventional telecommunication device endpoints serviced by the switch/server, and the switch/server can direct incoming contacts or calls to, and receive outgoing contacts or calls, from these extensions in a conventional manner. The second telecommunication devices can include, for example, wired and wireless telephones, PDAs, H.320 video phones and conferencing units, voice messaging and response units, and traditional computer telephony adjuncts.

It should be noted the present invention does not require any particular type of information transport medium between switch or server and first and second telecommunication devices. That is, the present invention may be implemented with any desired type of transport medium as well as combinations of different types of transport media.

The packet-switched network 162 can be any data and/or distributed processing network, such as the Internet. The network 162 typically includes proxies (not shown), registrars (not shown), and routers (not shown) for managing packet flows.

The packet-switched network 162 is in (wireless or wired) communication with an external first telecommunication device 174 via a gateway 178, and the circuit-switched network 154 with an external (wired) second telecommunication device 180 and (wireless) third telecommunication device 184. These telecommunication devices are referred to as "external" in that they are not directly supported as telecommunication device endpoints by the switch or server. The telecommunication devices 174 and 180 are an example of devices more generally referred to herein as "external endpoints."

In one configuration, the server 110, network 162, and first telecommunication devices 134 are Session Initiation Protocol (SIP) compatible and can include interfaces for various other protocols such as the Lightweight Directory Access Protocol or LDAP, H.248, H.323, Simple Mail Transfer Protocol or SMTP, IMAP4, ISDN, E1/T1, and analog line or trunk.

It should be understood the configuration of the switch, server, user telecommunication devices, and other elements as shown in FIG. 1 is for purposes of illustration only and should not be construed as limiting the present invention to any particular arrangement of elements.

As will be appreciated, the central server 110 is notified via LAN 142 of an incoming contact (e.g., a call) by the telecommunications component (e.g., switch 130, fax server, email server, web server, and/or other server) receiving the incoming contact. The incoming contact is held by the receiving telecommunications component until the server 110 forwards instructions to the component to forward or route the contact to a specific contact center resource, such as the IVR unit 122, the voice mail server 126, and/or first or second telecommunication devices 134, 138 associated with a selected agent.

The server 110 distributes and connects these contacts to telecommunication devices of available agents based on the predetermined criteria noted above. When the central server 110 forwards a voice contact to an agent, the central server 110 also forwards customer-related information from databases 114 to the agent's computer work station for viewing (such as by a pop-up display) to permit the agent to better serve the customer. The agent will then process the contact(s) sent to him/her by the server 110.

According to embodiments of the present invention, included among the programs executing on the server 110 are an agent and contact selector 220 and contact manager 232. The selector 220 and manager 232 are stored either in the main memory or in a peripheral memory (e.g., disk, CD ROM, etc.) or some other computer-readable medium of the center 100. The selector 220 and manager collectively effect an assignment between available contacts in a queue and available agents serving the queue (either singularly or in multiple assignments) in a way that tends to maximize contact center efficiency.

Figure 3:
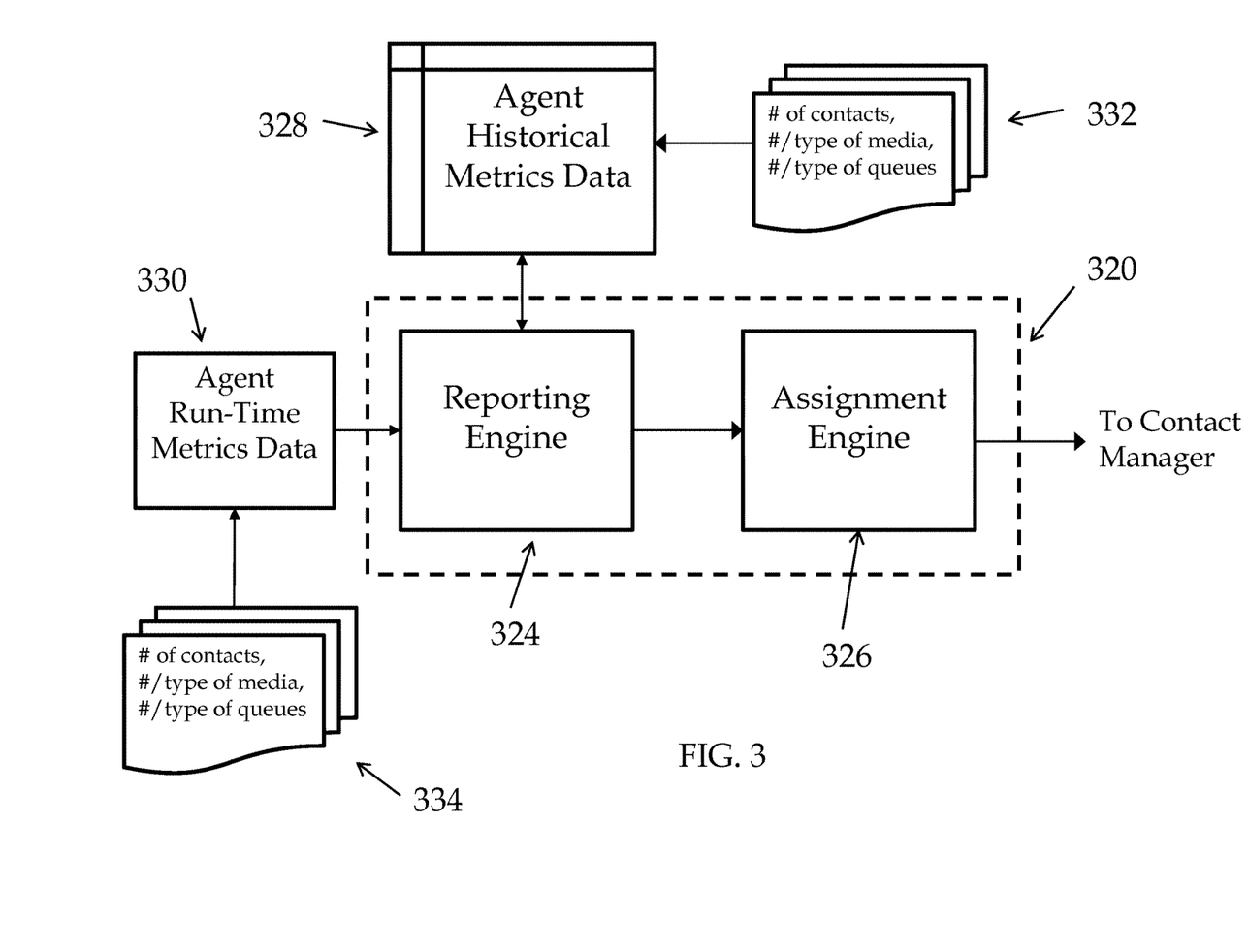
FIG. 3 is system block diagram of the server of FIG. 2, depicting the reporting engine and assignment engine in accordance with an embodiment of the present invention.

The selector 220 comprises a reporting engine 324 and assignment engine 326, see FIG. 3, which use predefined criteria in selecting an appropriate agent to service the contact and whether one agent can be assigned to more than one contact at any given time. In an embodiment, the contact manager 232 receives assignment information from the selector 220, which selector has determined and identified, in addition to matching agent with contact dependant on skills matched, the then current agent metrics of the selected agent for singular or multiple contacts support, and depending on whether that agent's metrics is within the target metrics for multiple assignments, provides instructions to the selector 220 to effect same.

The contact manager 232, based on one or more selected criteria, and agent metrics, may determine which contacts will be assigned to the same agent. One or more of the metrics parameters can be used along or in any combination and include but are not limited to average quality score, average customer satisfaction score, average revenues, percent of first call resolution, and the like. These parameters are considered along with how well an agent performs when handling a single contact verses more than one contact.

It is understood by embodiments of the present invention that a server, such as the one depicted in FIG. 2, may be connected to a computer network or system. A computer network includes the Internet, a global computer network, an internal computer network, dedicated server networks, and the like.

Referring to FIG. 3, which details the agent and contact selector 220 of FIG. 2, there is provided within the selector 320 the reporting engine 324 and the assignment engine 326. The assignment engine may also be referred to herein as the work assignment engine. Agent historical metrics data 328 is stored in the reporting engine 324. In addition, agent run-time metrics data 330 is stored in the reporting engine 324. The type of metrics data stored internally is comprised from a group of metrics elements 332 (historical metrics) and 334 (run-time or real time metrics data) including, but not limited to, the number of contacts, the number of media, the type of media, the number of queues, and the type of queues, all being scripted and processed by an agent at any given time.

It is to be understood that although embodiments of the present invention are described as gathering metrics data for one agent, these descriptions equally apply to more than one agent and in fact may apply to as many agents contained within a contact center or multiple contact centers at any given time. Furthermore, while embodiments of the present invention are described in connection with one contact center, it should be understood that it is within the scope of the present invention that these same systems and methods are scalable to be applied to agents at more than one contact center at any given time.

For example, although the description of the server 110, the agent and contact selector 220 and their respective sub-elements are discussed in the singular, it is understood that these elements 110 and 220 may represent multiple contact centers or each contact center may include one or more of these servers 110 and agent/contact selectors 220, or any combinations thereof. The system and method is described herein in the singular for purposes of clarity only.

In operation, referring to FIGS. 2 and 3, when contacts are received from the gateway 158 (FIG. 1) and queued on the communication lines 200a-y, the agent and contact selector 220 begins the selection process of matching agents to contacts. This includes matching contact skill set requirements with agent skills. In addition, however, as contemplated by embodiments of the present invention, the agent and contact selector 220 performs an additional process of determining whether an agent, who has been matched up with a liked skill contact, is capable of servicing additional contacts at substantially the same time as servicing the initial contact.

Prior to making this decision as to whether to assign more than one contact to the agent, the agent's historical metrics data is stored in a database of the reporting engine 324. Such historical data is metrics type information that has been collected about the agent prior to the current session of assigning one or more contacts to the agent. That is, "historical", may be any and all metrics information that has been previously collected and stored about the agent relating to the agent's metrics prior to the current session in which the agent is being assigned contacts. Therefore, this metrics information can be sourced from months, weeks, or days ago, to as recently as information from a t-1 agent/contact session, i.e., the agent/contact session just prior to the current agent/contact session. Such stored historical metrics data, in one embodiment of the present invention, may be weighted more heavily by the most recent agent/contact session.

The historical metrics data 328 is periodically updated in the reporting engine 324 with agent run-time metrics data 330 wherein, in certain embodiments, the then current run-time metrics data becomes the historical data for a future assignment session. In one embodiment, this occurs each and every time an agent has been assigned to one or more contacts for a new agent/contact session. It is contemplated that this updating may occur more or less frequently than after each session is terminated.

For example, if less frequently, it may be because the agent was only serving one contact and therefore it is not necessary for the historical metrics data to be updated. This is not to say that it could not still be so updated. However, it may optionally not be done at that time. When, on the other hand, an agent has just completed a session where that agent served at least two or more contacts at once, the historical metrics data may be updated immediately following the agent/contact session. Alternatively, the historical metrics data may be updates concurrently while the agent/contact session is in run-time mode, i.e., real time updating.

Once this information regarding the agent's metrics data is stored, the agent's then current metrics rating is sent to the assignment engine 326. The assignment engine then uses this data to determine if multiple contacts should be delivered to the agent and from what types of media and what types of queues. Once the assignment engine 326 determines that at a given moment the agent is capable of services more than one contact, the assignment engine 326 will report same to the contact manager 232 to assign such multiple contacts to that agent.

An advantage of embodiments of the present invention is the ability to have this type of agent metrics data adaptable, which will allow customers to maximize their results by intelligently using agents to script and process unrelated contacts and when effectiveness is not compromised. That is, whereas an agent may at a given moment, day or week, be very effective, i.e., its metrics is within the target metrics, at another moment or on another day, or in another week, the agent's metrics may fall outside of the target metrics and thus assigning multiple contacts to that agent when that agent's metrics falls short of the target metrics would be detrimental to the contact or customer satisfaction levels required in the contact centers.

Figure 4:
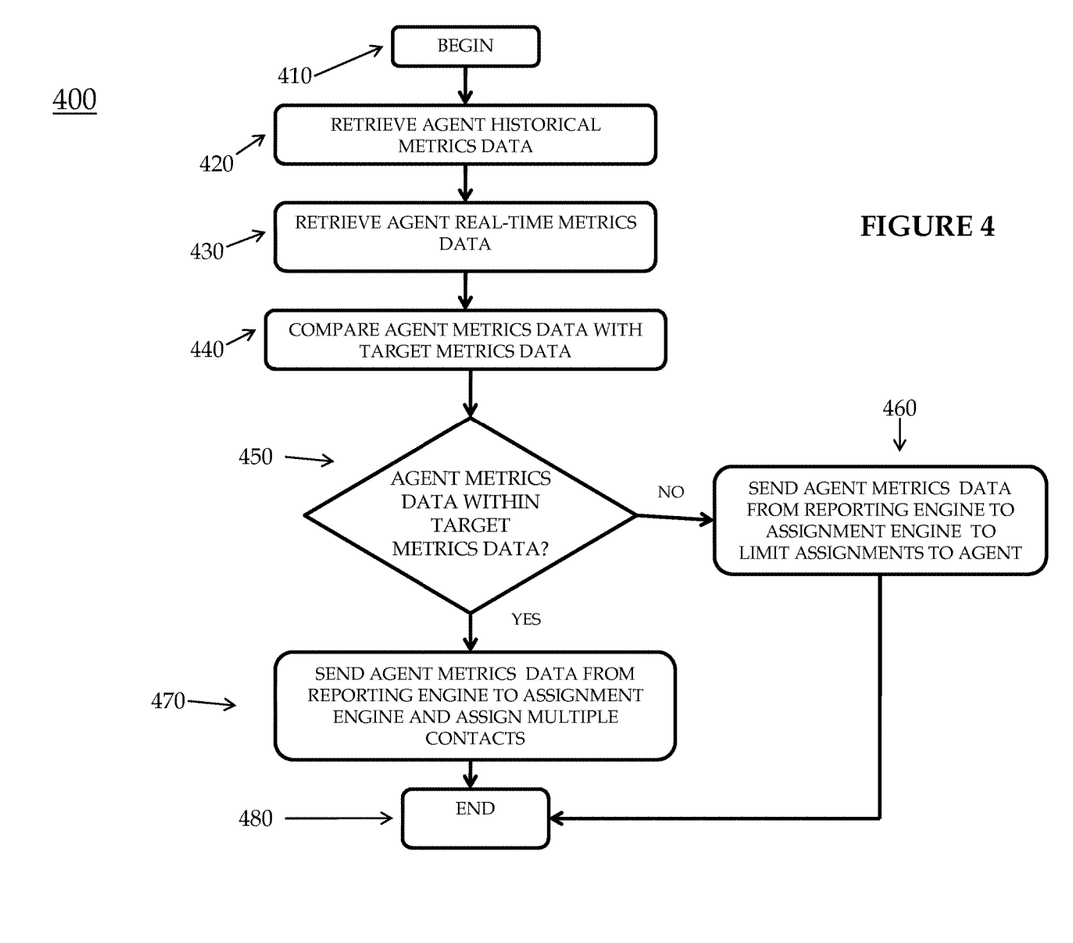
FIG. 4 is a flow chart depicting a method for assigning agent multiple contacts to an agent based upon the agent's metrics in accordance with another embodiment of the present invention.

In accordance with one embodiment of the present invention, utilizing the systems described in FIGS. 1-3, there is provided a method 400 for adaptively assigning multiple contacts to an agent in a contact center, which is depicted in FIG. 4. The method begins at step 410. At step 420, before the system will assign multiple contacts to an agent, the system checks to see if the agent's metrics is within the target metrics.

That is, the system needs to confirm the agent is capable, at a given time, to script and process more than contact without quality, effectiveness, efficiency, etc. being compromised. The agent's metrics comprises, but is not limited to, a standard of measurement by which efficiency, performance, progress, or quality of process of the agent can be assessed, collectively referred to as effectiveness measures. For example, in embodiments of the present invention, these effectiveness measures may include but not be limited to average quality score, average customer satisfaction score, average revenue, average handle duration, percentage of first call resolution, and the like.

The target metrics will be determined by the entity in charge of the contact center. The target metrics will include all of the above parameters and be set at a level whereby quality of service to the contacts/customers is at a satisfactory level. The agent's metrics will be determined on a substantially continuous basis and be continually updated as the agent performs his/her services with multiple contacts.

At a given point in time, prior to the system assigning multiple contacts to any given agent, the reporting engine will have saved in a database contained therein the last know effectiveness measures that make up the agent's metrics. Temporally, this will be considered the agent's historical metrics data. Thus, at step 420, in one embodiment, the reporting engine will retrieve such agent historical metrics data.

If the agent historical metrics data is within the target metrics data, then the agent becomes a candidate for receiving multiple contacts. The reporting engine will then report to the assignment engine to recommend to the contact manager to assign another contact of a given type to the agent.

In accordance with an embodiment of the present invention, while the agent is being assigned multiple contacts, at step 430, the system is retrieving updated agent real-time metrics data to determine if the agent's metrics is still within the target metrics. This way, the system's decision to assign multiple contacts to an agent is adaptable, dependent upon the then metrics measures of the agent.

In one embodiment, the step 430 is achieved as follows. As mentioned previously, both historical and current agent metrics are stored in the reporting engine for each agent as that agent relates to each contact stored in the reporting engine. Each contact being scripted and processed by the agent is stored with how many contacts are being simultaneously or substantially simultaneously scripted and processed by that agent.

In addition, each contact being scripted and processed by the agent is stored with what different media (voice, text, email, chat, instant messaging, etc.) are being simultaneously or substantially simultaneously scripted and processed by that agent. Furthermore, each contact being scripted and processed by the agent is stored with how many different queues or what the different queue are being simultaneously or substantially simultaneously scripted and processed by that agent.

At step 440, for each combination of number of contacts, number and type of media, and number and type of queues, the system compares the agent metrics data with the target metrics data to determine if the agent is still within the target metrics for the, e.g., effectiveness measures. If the answer is "yes," then at step 470 all combinations that are within the target metrics would be sent from the reporting engine to the assignment engine. The assignment engine would then direct the contact manager to assign additional contacts from the queues and media that the agent is still in target to the agent under scrutiny.

If, on the other hand, the answer is "no," then at step 460, all combinations that are not within the target metrics would be sent from the reporting engine to the assignment engine. The assignment engine would then direct the contact manager to limit the assignment of additional contacts to the agent under scrutiny. This may mean the agent is assigned only one contact or perhaps two. That way, the effectiveness of the agent can be preserved, albeit where the agent is only serving one or two contacts at that time. Although described herein as a "yes" or "no" decision, it is within the scope of embodiments of the present invention to consider what combination of contacts for which the agent is still available. If that query is answered in the negative, then the next step may be to do nothing. That is, alternatively, the assignment engine does not need to be informed and will therefore not assign any more contacts or work to the agent because it is not receiving any additional prompt from the reporting engine about the agent's metrics and whether or not to add contacts.

After either the agent is assigned additional contacts or is limited in the additional number of contacts, the method according to this embodiment of the present invention stops at step 480.

Figure 5:
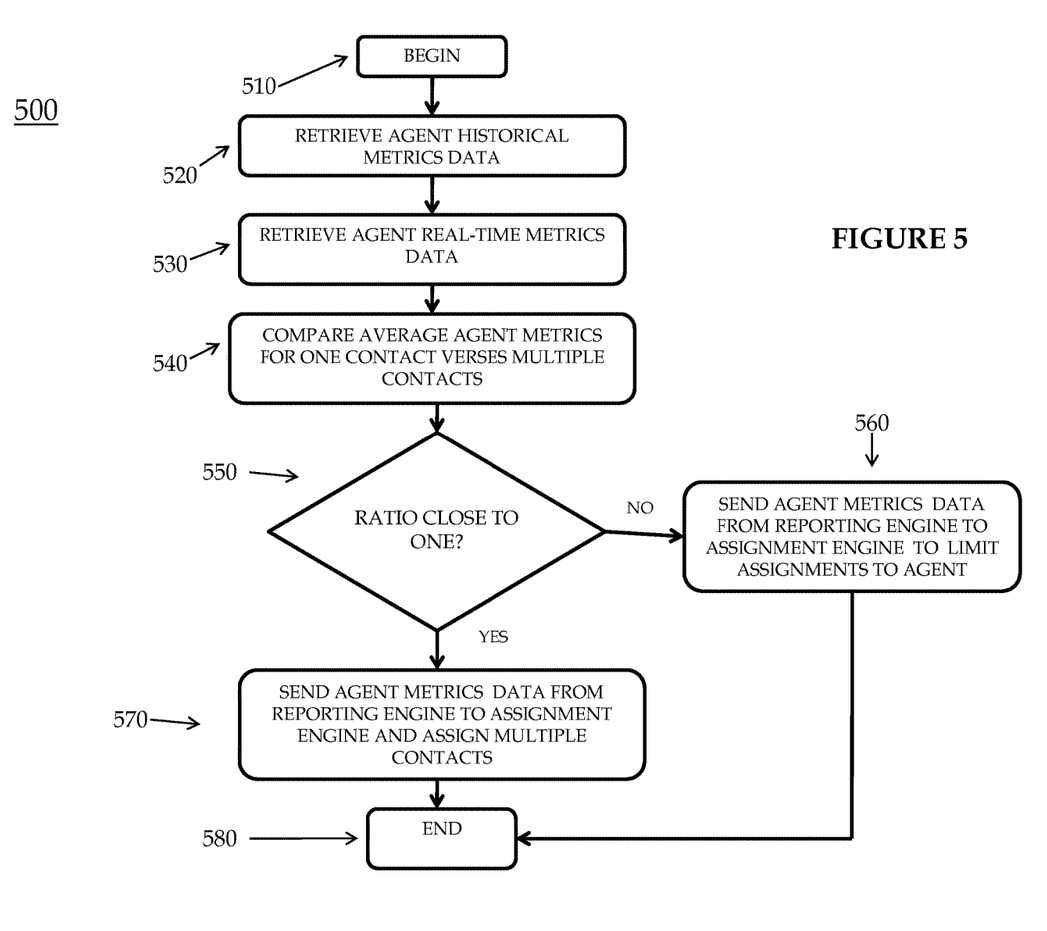
FIG. 5 is a flow chart depicting a method for assigning multiple contacts to an agent based upon the agent's metrics in accordance with another embodiment of the present invention.

In another embodiment, referring to FIG. 5, there is provided a method 500, which begins at step 510. Similar to the method depicted in FIG. 4, at step 520, the agent's historical metrics data is retrieved. At step 530, the agent's real-time metrics data is retrieved. At step 540, the above metrics data is compared to target data. In this particular embodiment, the comparison is made as follows.

For each metrics element, a ratio is calculated. In one example, the average for a particular effectiveness measure when an agent handles a single contact is compared to the average for when that same agent handles more than one contact substantially simultaneously. If the ratio is close to one, then the agent is a candidate to whom the assignment engine will distribute multiple unrelated contacts, which occurs at step 570. At step 560, if the ratio is not close to one, then the agent's assignments are limited. That is, if the answer to the question of "ratio close to one" is answered in the negative, then the agent metrics data is sent from the reporting engine to the assignment engine to limit assignments to the agent at that time. Once the agent is either assigned multiple contacts or is limited to one or so contacts, the method stops at step 580.

In another embodiment, when a new contact arrives, the assignment engine retrieves from the reporting engine the agent's currently assigned contacts and retrieves the agent's specific historical metrics data for substantially simultaneously handling the currently assigned contacts group plus the new contact. If, historically, the agent can handle this new mix, the assignment engine assigns the new contact to the agent.

Figure 6:
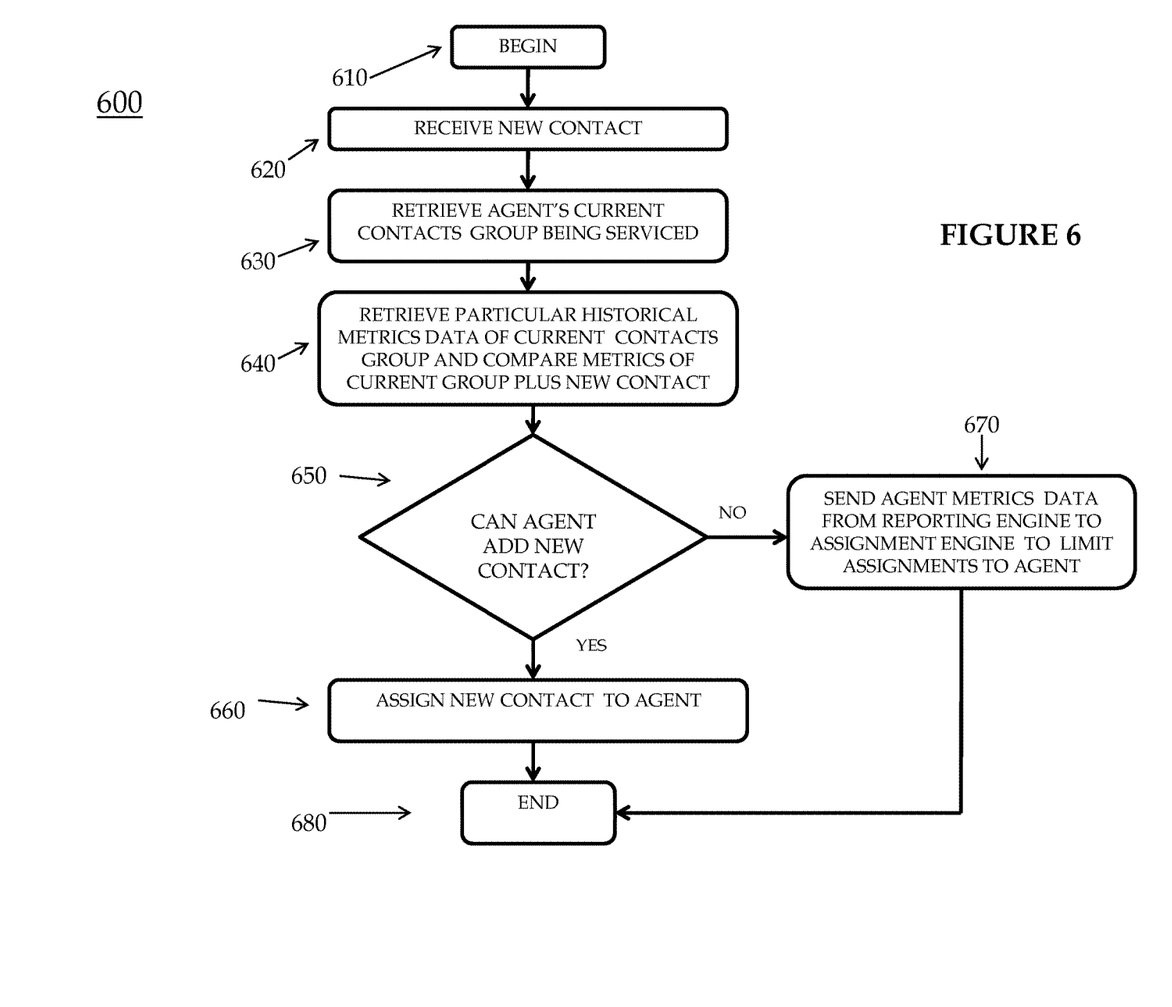
FIG. 6 is a flow chart depicting a method for assigning multiple contacts to an agent based upon the agent's metrics in accordance with another embodiment of the present invention.

Referring now to FIG. 6, specifically, the method 600 in accordance with this embodiment of the present invention begins at step 610. At step 620, a new contact arrives from the contact queue shown in FIG. 2 that matches the criteria for the agent being reviewed. At step 630, the assignment engine retrieves the agent's currently assigned contacts. Then, at step 640, the assignment engine retrieves particular historical data of the agent that relates to, when handling the current contacts group, how the agent would perform by adding the new contact.

After comparing this particular historical data at step 640, the method queries at step 650 whether the agent can handle the new contact with the current contacts group. If "yes", then at step 660, the assignment engine assigns the new contact to the agent. If the query is answered in the negative, then at step 670, the assignment engine assigns the new contact to another agent. The method in accordance with this embodiment ends at step 680.

Alone or in combination with any of the above embodiments, in another embodiment, the contact itself may have a preexisting condition that sets a restriction as to how many substantially simultaneous contacts it allows the agent to handle while handing this particular contact. This may be based on any number of criteria, for example, but not limited to, customer value, customer satisfaction, customer willingness to be put on hold, potential revenue, and the like. Should a contact arrive with this condition, then the system and method contemplated by embodiments of the present invention may include a function or step of determining such condition of the contact and if it exists, limiting the assignment of additional contacts to the agent once the conditional contact is matched to the agent.

Alternatively, if an agent is matched to the conditional contact, after that agent already is servicing more contacts than the conditional contact would allow, the assignment engine may notify the contact manager and/or the agent to, if at all possible, while maintaining business continuity, dispose of an existing contact so the agent may be assigned the conditional contact.

While the foregoing is directed to embodiments of the present invention, other and further embodiments of the invention may be devised without departing from the basic scope thereof. It is understood that various embodiments described herein may be utilized in combination with any other embodiment described, without departing from the scope contained herein.

What is claimed is:

1. A computer-implemented method for adaptively assigning multiple contacts to an agent computer in a contact center, the computer-implemented method comprising:
   querying, by a computer of the contact center, a database to request real-time effectiveness metrics for an agent;
   receiving, through a communication interface coupled to the computer of the contact center, the real-time effectiveness metrics from the database;
   storing, by the computer of the contact center, the agent's historical effectiveness metrics, wherein the historical effectiveness metrics are measured over a time period prior to a current session in which the agent computer is being assigned contacts;
   wherein the real-time effectiveness metrics and the historical effectiveness metrics comprise at least one agent effectiveness metrics element related to multiple simultaneous contacts being assigned to a contact center agent; and
   wherein the real-time effectiveness metrics and the historical effectiveness metrics comprise at least one of: average quality score; average customer satisfaction score, average revenue, average handle duration, or percentage of first contact resolution;
   determining, by the computer of the contact center, the at least one agent effectiveness metrics element, said determining based on the contacts presently being substantially simultaneously scripted and processed by the agent;
   updating, by the computer of the contact center, the historical effectiveness metrics to calculate updated effectiveness metrics, said updating based on the determined at least one agent effectiveness metrics element and the real-time effectiveness metrics; and
   comparing, by the computer of the contact center, the updated effectiveness metrics with stored target effectiveness metrics; and
   assigning, by the computer of the contact center, a new contact to the agent computer when the updated effectiveness metrics is within the target effectiveness metrics.

2. The method of claim 1, wherein the at least one effectiveness metrics element comprises a number of contacts substantially simultaneously being scripted and processed by the agent.

3. The method of claim 1, wherein the at least one effectiveness metrics element comprises a number of media types substantially simultaneously being scripted and processed by the agent.

4. The method of claim 3, wherein the number of media types is selected from a group consisting of voice, text, email, chat, or instant messaging.

5. The method of claim 1, wherein the at least one effectiveness metrics element comprises a number of different queues substantially simultaneously being scripted and processed by the agent.

6. The method of claim 5, wherein the number of different queues is selected from a group consisting of customer identity, customer needs, contact center needs, current contact center queue lengths, customer value, or the agent skill required for the proper handling of the contact.

7. The method of claim 1, wherein comparing further comprises:
   obtaining a ratio for the at least one effectiveness metrics element by comparing:
   a first average value of the historical effectiveness metrics when the agent scripts and processes one contact with
   a second average value of the historical effectiveness metrics when the agent scripts and processes more than one contact.

8. The method of claim 7, wherein when the ratio of the first and second values is approximately equal to one, then the agent computer is assigned the new contact.

9. The method of claim 1, wherein updating occurs directly after each contact is scripted and processed by the agent.

10. The method of claim 9, when the updated effectiveness metrics fall outside the target metrics, the agent is not assigned the new contact.

11. The method of claim 10, wherein the historical effectiveness metrics is based on weighting a most recent contact session of the agent more heavily than previous contact sessions of the agent.

12. The method of claim 1, further comprising:
determining when a conditional contact is present in the contacts presently being substantially simultaneously scripted and processed by the agent, the conditional contact having a restriction on substantially simultaneous assignments of agents, and
removing the conditional contact as a candidate for assignment to the agent computer until that agent is available to script and process the conditional contact.

13. The method of claim 12, wherein the conditional contact is determined based upon a predetermined criteria selected from a group consisting of customer value, customer satisfaction, customer willingness to be put on hold, or potential revenue.

14. A computer-implemented method for adaptively assigning multiple contacts to an agent computer in a contact center, the computer-implemented method comprising:
querying, by a computer of the contact center, a database to request historical metrics data for an agent,
wherein the historical metrics data are measured over a time period prior to a current session in which the agent computer is being assigned contacts; and
wherein the historical metrics data comprise at least one of: average quality score; average customer satisfaction score, average revenue, average handle duration, or percentage of first contact resolution;
receiving, through a communication interface coupled to the computer of the contact center, the historical metrics data for the agent from the database;
storing, in by the computer of the contact center, a record for each contact being served by the agent;
receiving, by the computer of the contact center, an indicator of a new contact being received at the contact center;
retrieving, by the computer of the contact center, a current contacts group assigned to the agent computer;
updating, by the computer of the contact center, the historical metrics data to calculate prospective metrics data, said updating based on adding the new contact to the current contacts group;
comparing, by the computer of the contact center, the prospective metrics data and target metrics data;
determining, by the computer of the contact center, whether the prospective metrics data will be within the target metrics data if the agent scripts and processes the new contact; and
assigning, by the computer of the contact center, the new contact to the agent computer when the prospective metrics data is within the target metrics data.

15. A computing system for adaptively assigning in real time multiple contacts to an agent computer in a contact center, comprising:
a bi-directional communications interface;
a memory device storing executable instructions, and
a processor in communication with the memory device and the bi-directional communications interface, wherein the processor when executing the executable instructions:
queries, via the bi-directional communications interface; a database to request historical metrics data for an agent,
wherein the historical metrics data are measured over a time period prior to a current session in which the agent computer is being assigned contacts; and
wherein the historical metrics data comprise at least one of: average quality score; average customer satisfaction score, average revenue, average handle duration, or percentage of first contact resolution;
receives, via the bi-directional communications interface, the historical metrics data for the agent from the database;
stores, in by the memory device, a record for each contact being served by the agent;
receives an indicator of a new contact being received at the contact center;
retrieves a current contacts group assigned to the agent computer;
updates the historical metrics data to calculate prospective metrics data, said updating based on adding the new contact to the current contacts group;
compares the prospective metrics data and target metrics data;
determines whether the prospective metrics data will be within the target metrics data if the agent scripts and processes the new contact; and
assigns the new contact to the agent computer when the prospective metrics data is within the target metrics.

16. The system of claim 15, wherein the processor when executing the executable instructions manages the current contacts group and the agent.

17. The system of claim 15, wherein the database stores at least one agent metrics element.

18. The system of claim 17, wherein the at least one agent metrics element comprises a number of simultaneous contacts being scripted and processed by the agent.

19. The system of claim 17, wherein the at least one agent metrics element comprises a number of media types substantially simultaneously being scripted and processed by the agent.

20. The system of claim 17, wherein the at least one agent metrics element comprises a number of different queues substantially simultaneously being scripted and processed by the agent.

21. A system for adaptively assigning multiple contacts to an agent computer in a contact center, comprising:
a telecommunications device that receives a new contact in the contact center;
a storage device storing a database of historical effectiveness metrics for an agent, real-time effectiveness metrics for the agent, and target effectiveness metrics;
a computer server in communication with the telecommunications device and the storage device, the computer server comprising:
a tangible computer readable medium storing executable instructions, and
a processor in communication with the tangible computer readable medium, wherein the processor when executing the executable instructions:
queries the database to request real-time effectiveness metrics for the agent;
receives the real-time effectiveness metrics from the database;
stores, in a memory coupled with the processor, the agent's historical effectiveness metrics, wherein the historical effectiveness metrics are measured over a time period prior to a current session in which the agent computer is being assigned contacts wherein the real-time effectiveness metrics and the historical effectiveness metrics comprise at least one agent effectiveness metrics element related to multiple simultaneous contacts being assigned to a contact center agent; and wherein the real-time effectiveness metrics and the historical effectiveness metrics comprise at least one of: average quality score; average customer satisfaction score, average revenue, average handle duration, or percentage of first contact resolution;

determines the at least one agent effectiveness metrics element based on the contacts presently being substantially simultaneously scripted and processed by the agent;

updates the historical effectiveness metrics to calculate updated effectiveness metrics, said updating based on the determined at least one agent effectiveness metrics element and the real-time effectiveness metrics; and compares the updated effectiveness metrics with the target effectiveness metrics; and assigns the new contact to the agent computer when the updated effectiveness metrics is within the target effectiveness metrics.

22. The system of claim 21, wherein the at least one metrics element comprises a number of simultaneous contacts being scripted and processed by the agent.

23. The system of claim 21, wherein the at least one metrics element comprises a number of media types substantially simultaneously being scripted and processed by the agent.

24. The system of claim 21, wherein the at least one metrics element comprises a number of different queues substantially simultaneously being scripted and processed by the agent.

* * * * *